US010705359B2

(12) United States Patent
Lin et al.

(10) Patent No.: US 10,705,359 B2
(45) Date of Patent: Jul. 7, 2020

(54) MONITOR

(71) Applicant: Qisda Corporation, Taoyuan (TW)

(72) Inventors: Chi-Cheng Lin, Taoyuan (TW);
Kuo-Chun Lee, Taoyuan (TW)

(73) Assignee: QISDA CORPORATION, Taoyuan (TW)

( * ) Notice: Subject to any disclaimer, the term of this patent is extended or adjusted under 35 U.S.C. 154(b) by 1 day.

(21) Appl. No.: 16/195,944

(22) Filed: Nov. 20, 2018

(65) Prior Publication Data

US 2019/0163000 A1 May 30, 2019

(30) Foreign Application Priority Data

Nov. 27, 2017 (CN) .......................... 2017 1 1203834

(51) Int. Cl.
G06F 1/16 (2006.01)
G02F 1/133 (2006.01)
G02F 1/1333 (2006.01)

(52) U.S. Cl.
CPC .... *G02F 1/13306* (2013.01); *G02F 1/133308* (2013.01); *G02F 2001/133314* (2013.01); *G06F 1/16* (2013.01)

(58) Field of Classification Search
None
See application file for complete search history.

(56) References Cited

U.S. PATENT DOCUMENTS

| 6,894,706 B1* | 5/2005 | Ward ........................ G06F 3/14 345/428 |
| 2012/0281383 A1* | 11/2012 | Hwang .................. G02B 30/25 361/807 |
| 2014/0204293 A1* | 7/2014 | Kim .................. G02F 1/133351 349/15 |
| 2014/0204310 A1* | 7/2014 | Lee .................... G02F 1/133528 349/62 |
| 2015/0219943 A1* | 8/2015 | Noh ..................... G02F 1/13338 349/61 |
| 2016/0215926 A1* | 7/2016 | Pollex .................. F16M 11/041 |
| 2016/0300513 A1* | 10/2016 | Ren .......................... G09F 9/301 |
| 2018/0149800 A1* | 5/2018 | Kim ....................... G02B 6/0055 |
| 2018/0317000 A1* | 11/2018 | Ham ....................... H04R 9/06 |

FOREIGN PATENT DOCUMENTS

CN 103517012 B 1/2014

OTHER PUBLICATIONS

Office action of counterpart application by TIPO dated Jul. 26, 2018.

* cited by examiner

*Primary Examiner* — Courtney L Smith
*Assistant Examiner* — Rashen E Morrison

(57) ABSTRACT

A monitor including a display device, a circuit board and a time controller (TCON) is provided. The display device includes a display panel and a backlight module. The backlight module is disposed opposite to the display panel and has a rear surface. The circuit board includes a first end and a second end, wherein the first end is connected to the display panel, and the second end is located on the rear surface of the backlight module. The TCON is connected to the second end of the circuit board, and the TCON and the backlight module are disposed in nonparallel.

17 Claims, 4 Drawing Sheets

MONITOR

This application claims the benefit of People's Republic of China application Serial No. 201711203834.2, filed Nov. 27, 2017, the subject matter of which is incorporated herein by reference.

BACKGROUND OF THE INVENTION

Field of the Invention

The invention relates in general to a monitor, and more particularly to a monitor with timing controller (TCON).

Description of the Related Art

A conventional monitor includes many necessary elements such as display panel, backlight module, power module, circuit board, and timing controller (TCON) which are normally disposed within a frame. However, such arrangement makes the monitor or the backlight module (the display panel and the backlight module) unable to comply with the trend of lightweight, slimness, thinness, and compactness.

Therefore, it has become a prominent task for the industries to provide a monitor capable of resolving the generally known problems disclosed above.

SUMMARY OF THE INVENTION

The invention relates to a monitor capable of resolving the generally known problems disclosed above.

According to one embodiment of the invention, a monitor including a display device, a circuit board and a time controller (TCON) is provided. The display device includes a display panel and a backlight module. The backlight module is disposed opposite to the display panel and has a rear surface. The circuit board includes a first end and a second end, wherein the first end is connected to the display panel, and the second end is located on the rear surface of the backlight module. The TCON is connected to the second end of the circuit board, and the TCON and the backlight module are disposed in nonparallel.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1A:
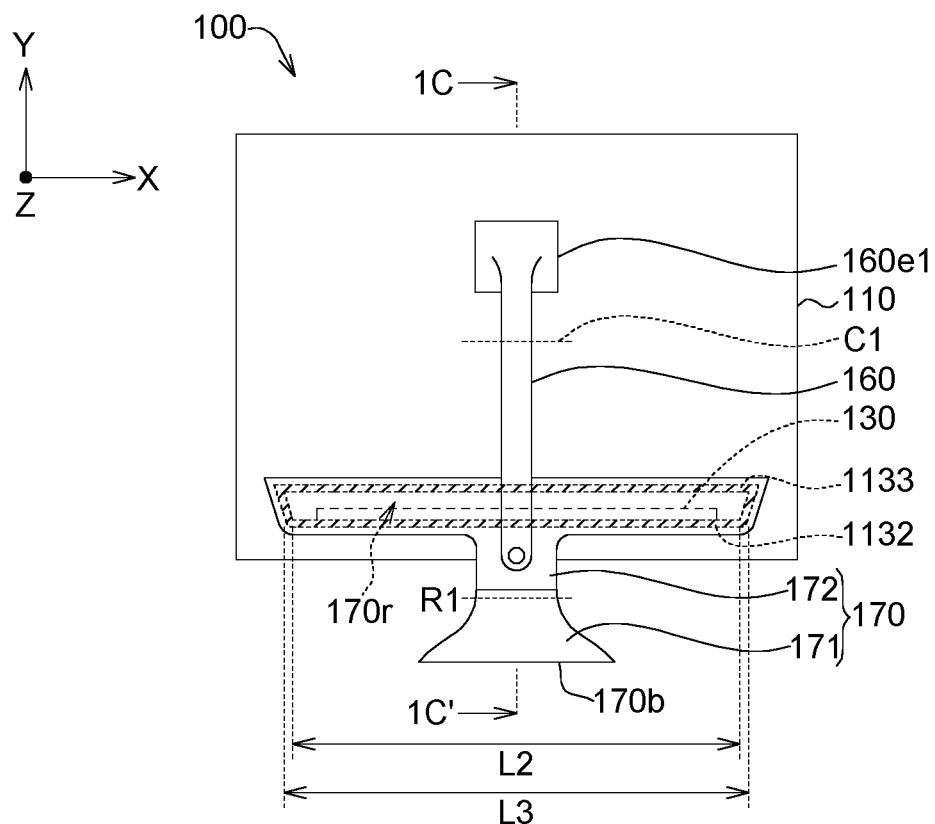
FIG. 1A is a rear view of a monitor according to an embodiment of the invention.
Figure 1B:
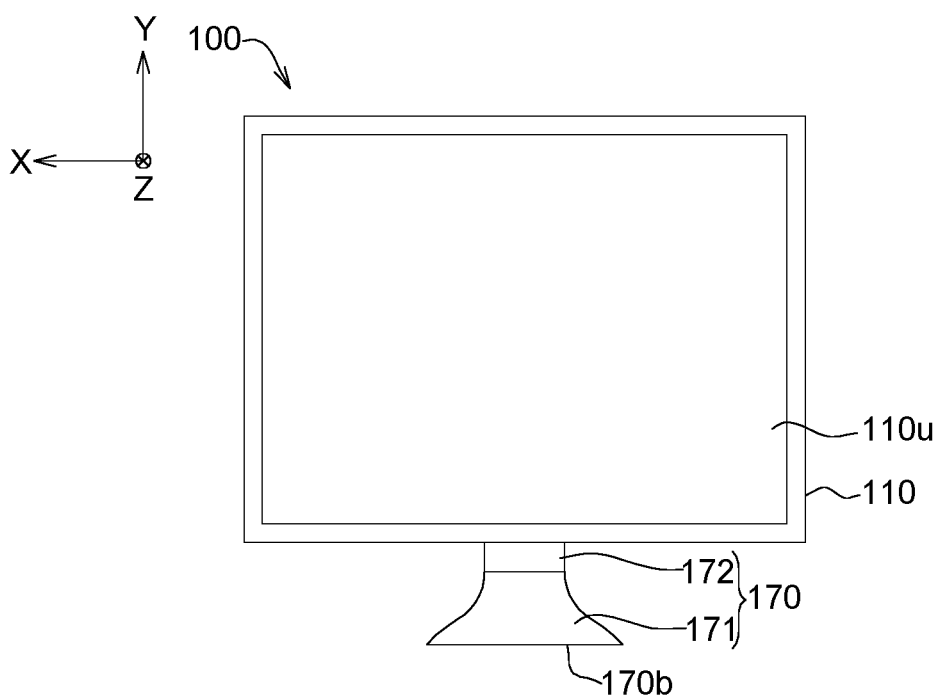
FIG. 1B is a front view of the monitor of FIG. 1A.
Figure 1C:
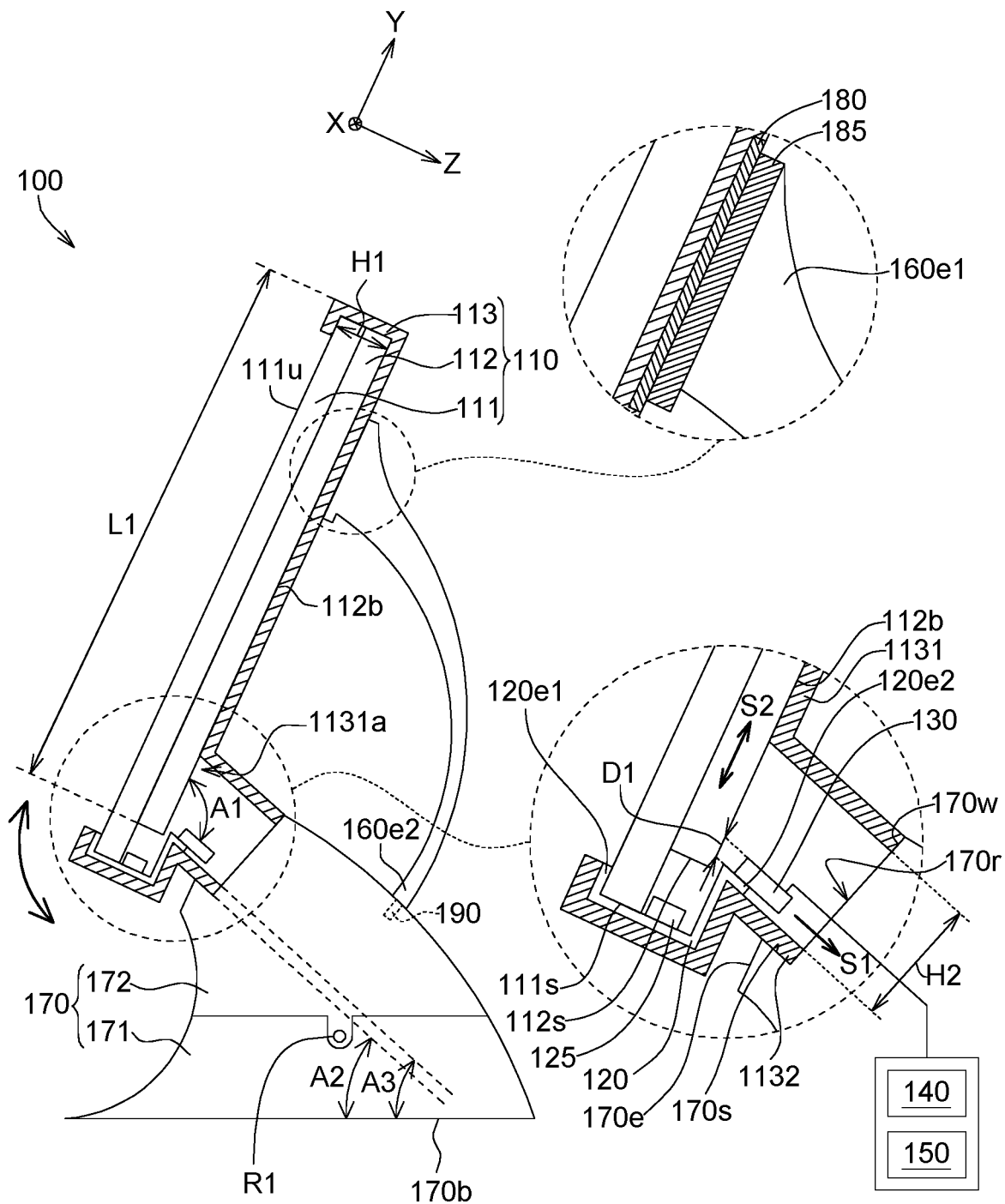
FIG. 1C is a cross-sectional view of the monitor of FIG. 1A along a direction 1C-1C'.

Refer to FIGS. 1A~1C. FIG. 1A is a rear view of a monitor according to an embodiment of the invention. FIG. 1B is a front view of the monitor 100 of FIG. 1A. FIG. 1C is a cross-sectional view of the monitor 100 of FIG. 1A along a direction 1C-1C'. The Z-axis is perpendicular to the display surface 111s, the Y-axis is the extending direction of the rear surface 112b of the backlight module 112 or the display surface 111u of the display panel 111, and the X-axis is the extending direction of the bottom surface 160b of the base 160.

The monitor 100 includes a display device 110, a circuit board 120, a drive chip 125, a time controller (TCON) 130, an automatic scaler 140, a power board 150, a stand 160 and a base 170.

The display device 110 includes a display panel 111, a backlight module 112 and a frame 113. The backlight module 112 and the display panel 111 are located on the frame 113 and are disposed oppositely. The display panel 111 can be realized by such as a liquid crystal display panel or other types of display panel. The backlight module 112 can be realized by such as a direct type backlight module or a side type backlight module.

The circuit board 120 can be realized by such as a flexible circuit board. The circuit board 120 includes a first end 120e1 and a second end 120e2. The first end 120e1 is electrically connected to the display panel 111. The second end 120e2 bypasses the lateral surface 111s of the display panel 111 and the lateral surface 112s of the backlight module 112 and is located on the rear surface 112b of the backlight module 112. The drive chip 125 is disposed on the circuit board 120, and is substantially located within the accommodation space formed by the lateral surface 112s of the backlight module 112, the display panel 111 and the frame 113. The drive chip 125 can drive the display panel 111 to display a frame.

The frame 113 can be the outmost decoration frame of the display device 110. The frame 113 can be realized by a single-layer structure or a multi-layer structure. Let the multi-layer structure be taken for example. The frame 113 may include an inner frame (not illustrated) and an outer frame (not illustrated), wherein the inner frame receives the display panel 111 and the backlight module 112, and the outer frame is the outmost decoration frame of the display device 110 and covers the inner frame and. In an embodiment, the outmost decoration frame can be a metal frame or a plastic frame, and the inner frame (if any) can be formed of metal or plastics.

In the present embodiment, the frame 113 can only receive the display panel 111, the backlight module 112, the circuit board 120 and the drive chip 125, or only receive the display panel 111 and the backlight module 112. The automatic scaler 140 and the power board 150 are electrically connected to the display device 110 and are disposed outside the frame 113 of the display device 110. For example, both the automatic scaler 140 and the power board 150 can be disposed within the base 170, outside the base 170 or on the rear surface of the frame 11. In another embodiment, the automatic scaler 140 and the TCON 130 can be integrated as one module.

As indicated in FIG. 1C, the frame 113 includes a rear plate 1131, a lower protruding plate 1132 and an upper protruding plate 1133. The rear plate 1131 is disposed opposite to the backlight module 112. The rear surface 112b of the backlight module 112 can be disposed on the rear plate 1131 and substantially parallel to the rear plate 1131. The lower protruding plate 1132 is protruded outward from the rear plate 1131 to support the second end 120e2 of the circuit board 120 and the TCON 130, so that the TCON 130 can be stably disposed on the frame 113. The rear plate 1131 has an opening 1131a through which the second end 120e2 of the circuit board 120 passes to reach the lower protruding plate 1132. Besides, the lower protruding plate 1132 is connected to the lower edge of the opening 1131a, and the circuit board 120 extends to the lower protruding plate 1132 from the lower edge of the opening 1131a, such that the length of the circuit board 120 can be shortened. Moreover, the TCON 130 can be selectively fixed on the circuit board 120 through an adhesive piece (not illustrated). In an embodiment, the second end 120e2 of the circuit board 120 can be fixed on the lower protruding plate 1132 through an adhesive piece (not illustrated).

The TCON 130 is a core circuit for controlling the timing actions of the display panel 111. The TCON controls the activation timing of the scan drive circuit, converts the input video signals (such as LVDS signals) to the data signals (such as mini-LVDS signals or RSDS signals) compatible with the data drive circuit, transmits the converted data signals to the data drive circuit (COF IC), and controls the timing activation of the data drive circuit.

As indicated in FIG. 1C, the upper protruding plate 1133 is protruded outward from the rear plate 1131 and connects the lower protruding plate 1132. The TCON 130 can be located at the space between the upper protruding plate 1133 and the lower protruding plate 1132. In an embodiment, the upper protruding plate 1133 and the lower protruding plate 1132 can be connected to form a protruded tube. In another embodiment, the upper protruding plate 1133, the lower protruding plate 1132 and the rear plate 1131 can be integrally formed in one piece by using a plastic injection molding method or a sheet-metal processing method.

The TCON 130 is connected to or located at the second end 120e2 of the circuit board 120. As indicated in FIG. 1C, the TCON 130 and the backlight module 112 are disposed in nonparallel, such that the ratio of the dimension D1 of the projection of the TCON 130 on the rear surface 112b to the length L1 of the rear surface 112b can be reduced. Since the TCON 130 and the backlight module 112 are disposed in nonparallel and the TCON 130 does not occupy any internal space of the frame 113, the internal height H1 of the frame 113 can be reduced. Furthermore, since the TCON 130 is not flush with the rear surface 120b and does not occupy any of the total thickness of the display panel 111 and the backlight module 112, the total thickness of the display panel 111 and the backlight module 112 can be reduced.

As indicated in FIG. 1C, the TCON 130 is protruded from the rear surface 112b, and the protruding direction S1 of the TCON 130 with respect to the rear surface 112b of the backlight module 112 is not parallel to the extending direction S2 of the backlight module 112b. For example, the angle A1 between the protruding direction S1 and the extending direction S2 is not equivalent to 0° or 180° and is such as an acute angle, an obtuse angle or an angle between 1°~179°. In an embodiment, the ratio of the dimension D1 of the TCON 130 along the extending direction S1 to the length L1 of the rear surface 112b of the backlight module 112 along the extending direction S2 (D1/L1) can be smaller than 1/10. Thus, the distance H2 between the lower protruding plate 1132 and the upper protruding plate 1133 of the frame 113 can be shortened, the dimension of the lower protruding plate 1132 and the upper protruding plate 1133 can be reduced, and the material usage of the frame 113 can be reduced. In another embodiment, the ratio (D1/L1) can be larger than or smaller than 1/10.

As indicated in FIG. 1C, the base 170 has a first accommodation recess 170r within which at least one part of the lower protruding plate 1132 and at least one part of the upper protruding plate 1133 can be located. Thus, the first accommodation recess 170r can extend inwardly from the end surface 170e of the base 170 to form a side wall 170w, and the end surface of the lower protruding plate 1132 can lean on the side wall 170w or can be fixed on the side wall 170w through an adhesive to enhance the stability of connection between the frame 113 and the base 170. For example, the end surface 170e of the present embodiment does not lean on the rear plate 1131 of the frame 113. In another embodiment, the end surface 170e can extend towards the rear plate 1131 of the frame 113 and lean on the rear plate 1131. Based on the said design, the lower protruding plate 1132 does not have to lean on the side wall 170w.

The first accommodation recess 170r has a bevel 170s inclined with respect to the bottom surface 170b of the base 170. The lower protruding plate 1132 leans on the bevel 170s. Furthermore, the angle A2 of the bevel 170s with respect to the bottom surface 170b is substantially equivalent to the angle A3 of the lower protruding plate 1132 with respect to the bottom surface 170b, such that the lower protruding plate 1132 and the bevel 170s are substantially in parallel, and the contact area between the lower protruding plate 1132 and the bevel 170s is maximized. Thus, the lower protruding plate 1132 can lean on the bevel 170s more stably.

As indicated in FIG. 1C, the stand 160 includes a third end 160e1 and a fourth end 160e2, wherein the third end 160e1 and the display device 110 are fixed by a magnetic attraction, and the fourth end 160e2 is fixed on the stand 170. For example, the monitor 100 further includes a first magnetic piece 180 and a second magnetic piece 185. The first magnetic piece 180 is disposed on the rear plate 1131 of the frame 113. The second magnetic piece 185 is disposed on the third end 160e1. The stand 160 can be fixed on the frame 113 through the magnetic attraction between the first magnetic piece 180 and the second magnetic piece 185. Besides, the monitor 100 further includes a locking element 190 disposed on the fourth end 160e2. The stand 160 is locked on the base 170 through the locking element 190.

As indicated in FIGS. 1B and 1C, the third end 160e1 of the stand 160 is located above the central position C1 of the frame 113. In another embodiment, the third end 160e1 of the stand 160 is substantially located at the central position C1 of the frame 113 or under the central position C1.

As indicated in FIGS. 1B and 1C, the base 170 includes a base 171 and a rotation portion 172. The base 171 has the said bottom surface 170b (such as a desktop, wall or ground) on which a carrier can be placed or fixed. The fourth end 160e2 of the stand 160 is fixed on the rotation portion 172 of the base 170 and is interlinked with the rotation portion 172. The rotation portion 172 is pivotally connected on the base 171. For example, the rotation portion 172 tilts around the rotation shaft R1 with respect to the base 171 to adjust the pitch angle of the display device 110. The rotation shaft R1 is such as parallel to the extending direction of the bottom surface 170b. In an embodiment, when the rotation portion 172 tilts with respect to the base 171, the display device 110, the rotation portion 172 and the stand 160 are interlinked and moved together. That is, the display device 110, the rotation portion 172 and the stand 160 do not generate relative movement, but tilt together with respect to the base 171.

As indicated in FIG. 1A, the lower protruding plate 1132 has a length L2, and the first accommodation recess 170r of the rotation portion 172 has a length L3, wherein the length L3 is substantially equivalent to or larger than the length L2 to receive the length of the entire lower protruding plate 1132. In another embodiment, the length L3 can be smaller than the length L2, such that at least one of the two ends of the lower protruding plate 1132 is protruded from the first accommodation recess 170r.

Figure 2A:
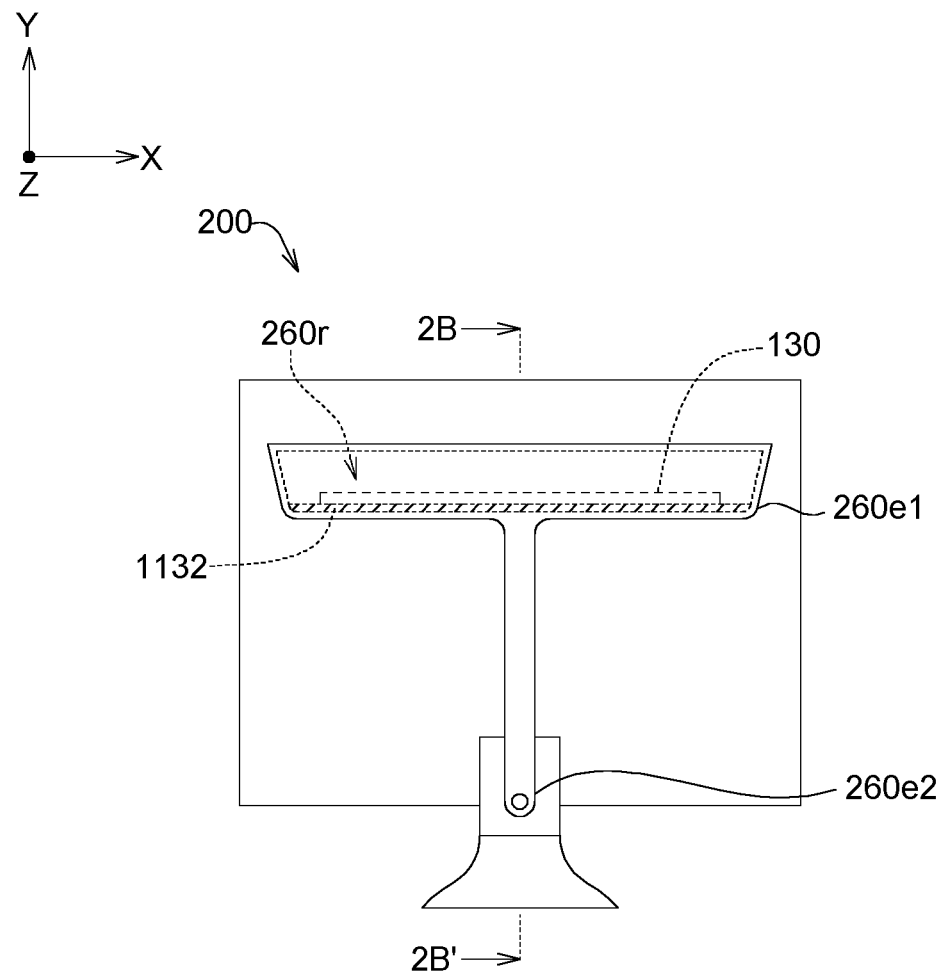
FIG. 2A is a rear view of a monitor according to another embodiment of the invention.
Figure 2B:
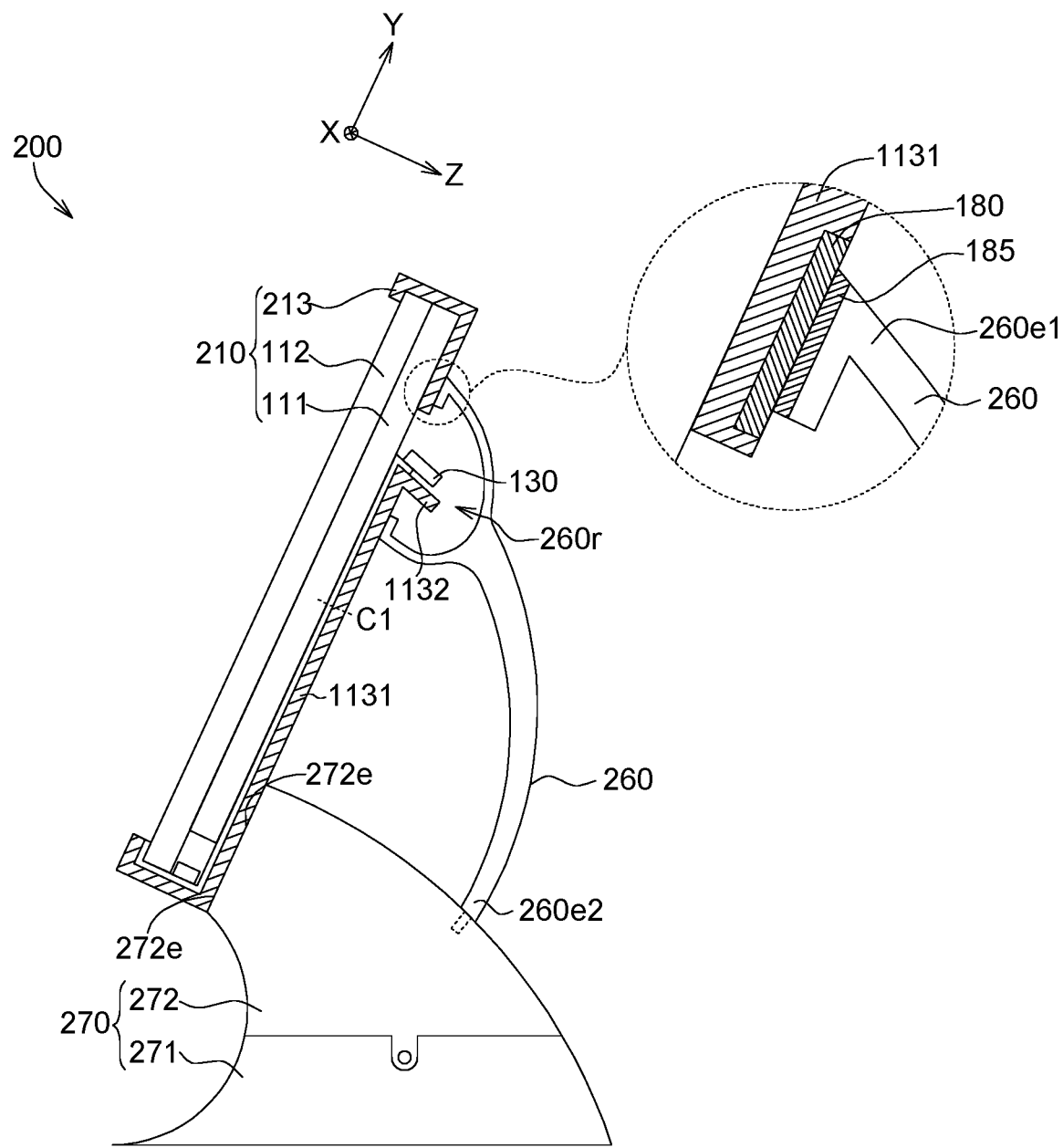
FIG. 2B is a cross-sectional view the monitor of FIG. 2A along a direction 2B-2B'.

Refer to FIGS. 2A and 2B. FIG. 2A is a rear view of a monitor 200 according to another embodiment of the invention. FIG. 2B is a cross-sectional view the monitor 200 of FIG. 2A along a direction 2B-2B'.

The monitor 200 includes a display device 210, a circuit board 120, a drive chip 125, a TCON 130, an automatic scaler 140, a power board 150, a stand 260 and a base 270.

The monitor 200 of the present embodiment is similar to the monitor 100 except that the TCON 130 and the lower protruding plate 1132 of the present embodiment are located at the third end 260e1 of the stand 260. The stand 260 supports the display device 210 and has an accommodation recess for receiving the TCON 130.

As indicated in FIG. 2B, the stand 260 has a third end 260e1 and a fourth end 260e2. The third end 260e1 of the stand 260 is located above the central position C1 of the frame 213. Or, the third end 260e1 can be substantially located at the central position C1 or under the central position C1. The display device 210 includes a display panel 111, a backlight module 112 and a frame 213. The frame 213 includes a rear plate 1131 and a lower protruding plate 1132. The third end 260e1 of the stand 260 has a second accommodation recess 260r for receiving the lower protruding plate 1132 of the frame 213 and the TCON 130 disposed above the lower protruding plate 1132. The frame 213 of the present embodiment is different from the frame 113 of the above embodiments in that the frame 213 can dispense with the upper protruding plate 1133 to reduce the volume of the protruding plate so that the lower protruding plate 1132 and the TCON 130 can be received within the second accommodation recess 260r more easily. Moreover, the base 270 includes a base 171 and a rotation portion 272 pivotally connected to the base 171, wherein the end surface 272e of the rotation portion 272 can directly lean on the rear plate 1131 of the frame 213. In the present embodiment, the rotation portion 272 can dispense with the first accommodation recess 170r.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A monitor, comprising:
   a display device, comprising:
   a display panel; and
   a backlight module disposed opposite to the display panel and having a rear surface;
   a circuit board, comprising a first end and a second end, wherein the first end is connected to the display panel, and the second end is located on the rear surface of the backlight module; and
   a timing controller (TCON) connected to the second end of the circuit board, wherein the TCON and the backlight module are disposed in nonparallel;
   wherein the TCON is protruded from the rear surface, and a protruding direction of the TCON opposite to the rear surface of the backlight module is not parallel and not perpendicular to an extending direction of the backlight module.

2. The monitor according to claim 1, further comprising:
   an automatic scaler and a power board electrically connected to the display device and disposed outside the display device.

3. The monitor according to claim 1, wherein a ratio of the thickness of the TCON along the extending direction to the length of the rear surface of the backlight module along the extending direction is smaller than 1/10.

4. The monitor according to claim 1, wherein the display device further comprises:
   a frame receiving the display panel and the backlight module and comprising:
   a rear plate disposed opposite to the backlight module is; and
   a lower protruding plate protruded outward from the rear plate;
   wherein, the TCON is located on the lower protruding plate.

5. The monitor according to claim 4, wherein the lower protruding plate is located above a middle position of a rear surface of the frame.

6. The monitor according to claim 5, the monitor further comprises:
   a base having an end surface leaning on the frame;
   a stand having a third end and a fourth end, wherein the third end has a second accommodation recess receiving the TCON, the third end is connected above a middle position of a rear surface of the frame, and the fourth end is connected to the base;
   wherein the lower protruding plate is located within the second accommodation recess.

7. The monitor according to claim 4, wherein the frame only receives the display panel and the backlight module.

8. The monitor according to claim 4, wherein a protruding direction of the lower protruding plate protruded from the rear surface is not parallel to the extending direction of the backlight module.

9. The monitor according to claim 4, further comprising:
   a base having a first accommodation recess, wherein at least one part of the lower protruding plate is located within the first accommodation recess.

10. The monitor according to claim 9, wherein an angle of a bevel of the first accommodation recess with respect to a bottom surface of the base is substantially equivalent to an angle of the lower protruding plate with respect to the bottom surface.

11. The monitor according to claim 1, further comprising:
    a base; and
    a stand, comprising a third end and a fourth end, wherein the third end of the stand and the display device are fixed by a magnetic attraction, and the fourth end of the stand and the stand are fixed.

12. The monitor according to claim 1, wherein the display device further comprises a frame receiving the display panel and the backlight module; and the monitor further comprises:
    a base having an end surface leaning on the frame;
    a stand having a third end and a fourth end, wherein the third end has a second accommodation recess receiving the TCON, the third end is connected above a middle position of a rear surface of the frame, and the fourth end is connected to the base.

13. The monitor according to claim 12, wherein the TCON is entirely disposed within the second accommodation recess.

14. The monitor according to claim 1, further comprising:
a stand supporting the display device and having an accommodation recess receiving the TCON.

15. The monitor according to claim 14, wherein the stand has a third end fixed on a rear surface of the display device, the third end is substantially located at the middle position of the rear surface of the display device.

16. A monitor, comprising:
a display device, comprising:
a display panel; and
a backlight module disposed opposite to the display panel and having a rear surface;
a circuit board, comprising a first end and a second end, wherein the first end is connected to the display panel, and the second end is located on the rear surface of the backlight module; and
a timing controller (TCON) connected to the second end of the circuit board, wherein the TCON and the backlight module are disposed in nonparallel;
wherein the TCON is protruded from the rear surface, and a protruding direction of the TCON opposite to the rear surface of the backlight module is not parallel to an extending direction of the backlight module;
wherein the display device further comprises:
a frame receiving the display panel and the backlight module and comprising:
a rear plate disposed opposite to the backlight module is; and
a lower protruding plate protruded outward from the rear plate;
wherein, the TCON is located on the lower protruding plate;
wherein the lower protruding plate is located above a middle position of a rear surface of the frame.

17. A monitor, comprising:
a display device, comprising:
a display panel; and
a backlight module disposed opposite to the display panel and having a rear surface;
a circuit board, comprising a first end and a second end, wherein the first end is connected to the display panel, and the second end is located on the rear surface of the backlight module; and
a timing controller (TCON) connected to the second end of the circuit board, wherein the TCON and the backlight module are disposed in nonparallel;
wherein the TCON is protruded from the rear surface, and a protruding direction of the TCON opposite to the rear surface of the backlight module is not parallel to an extending direction of the backlight module;
wherein the display device further comprises a frame receiving the display panel and the backlight module; and the monitor further comprises:
a base having an end surface leaning on the frame;
a stand having a third end and a fourth end, wherein the third end has a second accommodation recess receiving the TCON, the third end is connected above a middle position of a rear surface of the frame, and the fourth end is connected to the base.

* * * * *